SECRET COMMUNICATION SYSTEM

Filed May 10, 1946

INVENTOR
A. G. CHAPMAN
BY
H. A. Burgess
ATTORNEY

Patented June 12, 1951

2,556,677

UNITED STATES PATENT OFFICE 2,556,677

SECRET COMMUNICATION SYSTEM

Arthur G. Chapman, East Orange, N. J., assignor to Bell Telephone Laboratories, Incorporated, New York, N. Y., a corporation of New York Application May 10, 1946, Serial No. 668,697

10 Claims. (Cl. 179—1.5)

The present invention relates to signal transmission of a type which is capable of giving an effective degree of privacy of transmission with a very small amount of equipment, particularly in certain fields of application.

Ordinary telephone pairs in lead covered cable are not easily accessible for physical tapping between terminals and are not readily susceptible to external inductive pick-up of any one conversation independently of other simultaneous conversations on other cable pairs. The crosstalk within the cable can be kept to a usually harmless level by known methods. For most practical purposes conversations passing over cable pairs are, therefore, considered private.

Where a higher than ordinary degree of privacy in cable pair transmissions is desired, the invention offers a simple and effective way of defeating attempts to pick up conversations by inductive methods whether by crosstalk into other pairs in the cable or by use of exploring coils. While the method of the invention would not be entirely proof against tapping involving making physical connections to the particular cable pair in use, the liability of such tapping is usually small and can be assessed in particular cases and, moreover, where gas pressure and circuit unbalance alarms are provided at the cable terminals, attempts at tapping would, in most cases, be indicated by these alarms. Successful tapping could only be done by a skilled technician using complicated apparatus and having full knowledge of the system.

According to this invention, the speech or other signal currents passing over a line or channel are guarded against unauthorized reception along their path of travel by applying over-riding noise currents to the line simultaneously with the speech.

This effectively prevents pick-up of the speech by crosstalk or other inductive pick-up. The noise is kept out of the terminal sets by means of hybrid balance which can be made highly effective in practice in the types of lines contemplated for application of this method of protection.

One field of use for the invention is in off-premise extension privacy lines used for connecting the terminal points of radio or other privacy systems to subscriber stations located a few miles from such terminals. Where a high degree of privacy or secrecy is provided over the radio link, for example, an equally high degree of security is desired in the terminal-subscriber extension circuits. The invention admirably meets this situation by requiring only a small amount of equipment at the subscriber stations and by not requiring the use of scrambling methods on the speech waves which might degrade their quality, especially if attempt were made to secure a good degree of masking of the intelligibility with only relatively simple apparatus. While this field of use for the invention is typical, it is not to be considered as limiting in any sense.

A more complete understanding of the invention will be had from the following detailed description of the typical embodiments shown on the attached drawing in which.

Figure 1:
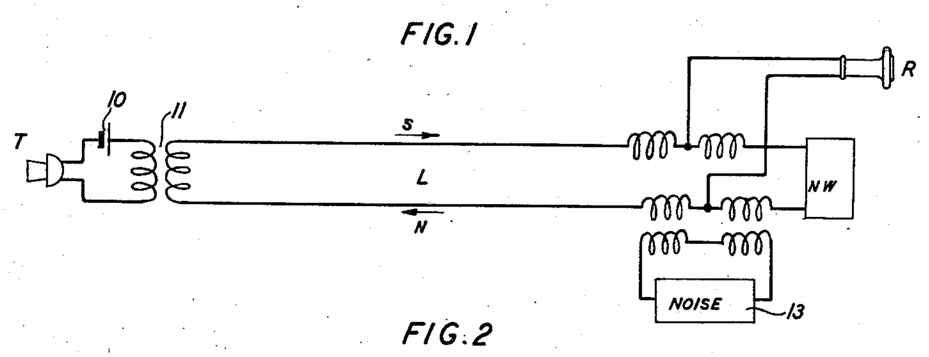
Fig. 1 is a simplified schematic circuit diagram illustrating how the protective scheme according to the invention can be applied to a one-way telephone line.

Referring to Fig. 1, a subscriber's transmitter or microphone T is shown energized by battery 10 and coupled by transformer 11 to telephone line L. At the opposite end of the line is a source of noise waves 13 having sufficient frequency band width and volume to mask effectively the speech currents from T, at all points along the line L. The line is provided with a hybrid coil H and line balancing network NW for enabling the noise source 13 and telephone receiver R to be coupled to the line in conjugate relation to each other. With a perfect balance none of the noise energy can enter the receiver R from source 13. In practice the line balance can be made good enough to permit the use of noise waves of sufficiently high volume to arrive at the speech transmitting end of the line in such strength as to mask the speech (e. g. 10 decibels above speech level) and still keep a satisfactory signal-to-noise ratio in the receiver.

The noise source may advantageously take the form of a gas-filled tube generator of continuous spectrum energy, the band used covering all frequencies from near zero up to a limiting frequency corresponding to the uppermost frequencies used in the speech transmission over the line L, such upper limiting frequency being determined by an output band-pass filter. Such generators are well known in the art and one such generator is disclosed in United States patent to R. R. Riesz 2,183,248 granted December 12, 1939. A line loss between terminals of as much as 6 decibels will give generally satisfactory results, by way of example, this loss value not necessarily being the limit of satisfactory or practicable operation.

Any one picking up transmission from line L inductively in the form of crosstalk into another cable pair or by use of an exploring coil, etc., would not be able to receive the speech message on account of the overpowering noise.

Figures 2, 3:
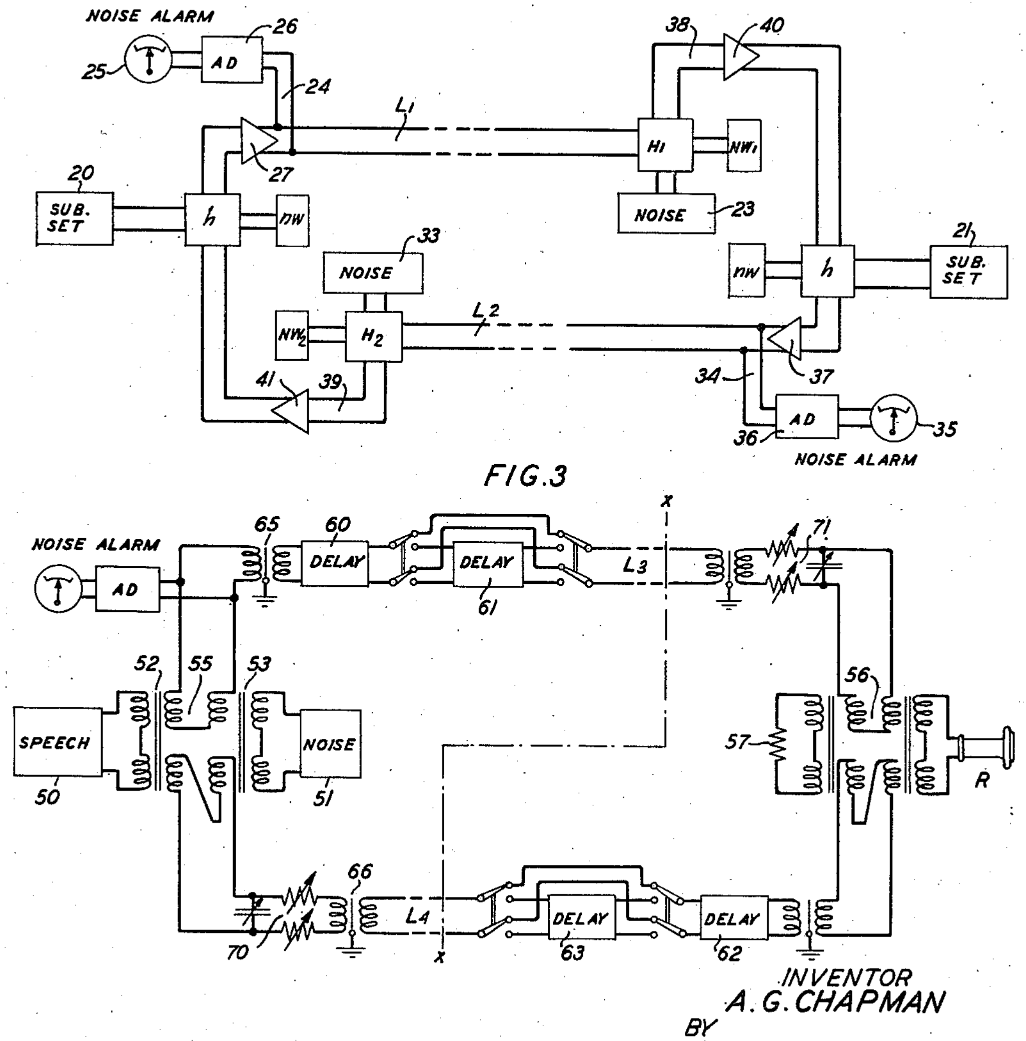
Fig. 2 is a similar diagram showing how two lines of the type shown in Fig. 1 might be associated to form a two-way transmission circuit.
Fig. 3 is a similar diagram of an alternative method according to the invention, as applied to a one-way transmission circuit.

Referring to Fig. 2, an eastward line $L_1$ is used for transmitting speech from subscriber station or other terminal 20 to station or terminal 21, while a westward line $L_2$ is used to transmit in the opposite direction between these stations. Line $L_1$ is protected by noise waves from source 23 which pass over line $L_1$ to branch 24 at the west terminal where they actuate noise alarm meter 25 after being amplified and detected at 26. Unilateral circuit or amplifier 27 prevents these noise currents from reaching the subset hybrid *h*. Alarm meter 25 may be located in front of the talker and its scale can be half red and half green to indicate to the talker whether the noise level is being satisfactorily maintained to make it safe for him to talk.

An analogous arrangement is provided for line $L_2$, a separate noise source 33 being provided. Also the noise alarm circuit is shown at 34, 35 and 36 and blocking amplifier at 37, for this side of the system.

The hybrid coils $H_1$ and $H_2$ with their line balancing networks $NW_1$ and $NW_2$ serve to separate the noise currents in each case from the speech currents so as to keep the noise currents out of the receiving branches 38 and 39. Receiving amplifiers 40 and 41 are shown in these branch circuits. The outgoing and incoming speech transmissions at each terminal station are separated by the subset hybrid coils *h*, *h* and their subset balancing networks *nw* and *nw*, respectively. Each side of the system of Fig. 2 operates in the same manner as described in connection with Fig. 1.

Fig. 3 shows a type of system that is better suited to transmission over somewhat greater distances than the previous figures. In Fig. 3 the noise currents are applied to the line at the same end as the speech currents to be masked thereby, instead of being applied at the far end. Fig. 3 shows a one-way circuit and it will be obvious from this figure, with the aid of Fig. 2, how two separate one-way systems can be combined to form a two-way system. In this case such a two-way system would require four lines or cable pairs.

In Fig. 3 the speech waves from source or circuit 50 and the noise waves from source 51 are both applied by way of the hybrid coil 55 to the two lines $L_3$ and $L_4$ for transmission to the opposite station. There the speech and noise currents are separated by means of hybrid coil 56, the speech currents passing to the receiver R and the noise currents being dissipated in resistor 57. The effect of the delay devices 60 to 63 will be described later on but for the present it may be assumed that these devices are omitted and the lines continued through in place of them. It will be seen that since the speech and noise travel together down each line in the same direction it will be impossible to separate them if access is had to only one of the two lines. An outsider would be unable to obtain the message free from the noise unless he had access to both lines $L_3$ and $L_4$. In a multipair cable where several systems like that of Fig. 3 are included in the same cable, it becomes difficult and time-consuming to pair off the various circuits to find which two are carrying the same message and noise currents. As already noted, since message and noise currents are transmitted in the same direction they are attenuated in the same amount so that the magnitude of the original noise currents is determined by the margin required to mask the speech currents at the transmitting end and not additionally by the line loss. This fact adapts this system for transmission over greater distances than is practical with the system of Figs. 1 and 2.

In order to receive the speech free of noise at receiving point R, the noise currents transmitted over line $L_4$ are made to neutralize in receiver R the noise currents transmitted over line $L_3$. In hybrid coil 55 the speech current coils and one pair of line windings are wound on one core 52 and the noise current coils and the other pair of line windings are wound on a separate core 53. It will be noted that one of the coils, in this case one of the line windings on noise current core 53, is reversed in connecting to the line $L_4$. This causes the noise currents sent over line $L_4$ to be in opposite phase to the noise currents sent over line $L_3$, the speech currents on the other hand being in the same phase on both lines. In hybrid coil 56 the speech currents sent over the two lines produce additive effects upon receiver R while the noise currents sent over the respective lines are opposed in their effects on receiver R. Conversely, the noise currents are additive in resistance load 57 while the speech currents are balanced out with respect to resistance 57.

If an outsider were able to tap both lines $L_3$ and $L_4$ at some point indicated by the line *x—x* and knew that the noise currents in line $L_3$ were of the same character as, but opposite in phase to, those in line $L_4$, he could, by properly poling the tapped connections, balance out the noise currents and receive the speech.

One way of adding to the difficulty of doing this is to include a delay device such as 60 in line $L_3$ near the transmitting end and an exact duplicate delay device 62 in line $L_4$ near the receiving end. These devices may be electrical networks or other known type of delay device for introducing phase delay and in their simplest form their phase shift characteristics are linear over the transmission frequency range. Since at the tapping point the noise currents have passed through only one of the two delay networks, direct comparison of the currents in the two lines by connecting a high resistance bridge across each line and leading them both to a receiver will not permit more than a single frequency or very narrow band of speech currents to be detected with any one connection. For, if the leads are connected to the receiver in one way the noise currents will have a 180-degree phase relation at theoretically only one frequency. Reversing the leads will cause the noise currents to cancel at a single frequency twice the first-mentioned frequency since at such higher frequency the phase between the noise currents is 360 degrees. In order to recover the speech successfully it would be necessary for the eavesdropper to have either a duplicate of the delay device used in the line or in this particular case a delay network having a linear phase shift characteristic that is variable over a large range and to adjust this until a sufficient frequency band of the speech signal to give intelligibility is uncovered.

Additional or substitute delay devices 61 and 63 are shown to be switched into or out of circuit at times agreed upon by the communicating parties, in order to make unauthorized pick-up more difficult. Alternatively, variable phase shift networks or devices could be used together with means for adjusting the amount of the phase shift at intervals or in a more or less continuous manner.

Shielded repeating coils 65, 66 are shown near the ends of each line and adjustable artificial lines 70, 71, to aid in securing equality of phase shift and attenuation in the lines $L_3$ and $L_4$. It will be understood also that a high degree of balance is desirable in each coil between the impedances of sources 50 and 51 and between resistances R and 57. Likewise, the impedance looking into the delay network toward the hybrid coil must closely match the impedance looking into the shielded repeating coil on the other line and at the same end as the delay network.

It will be clear that the circuit of Fig. 3 can be used either with or without the delay devices, with the accompanying effects as described. The invention is not to be construed as limited to the details disclosed but its scope is defined in the claims, which follow.

What is claimed is:

1. In a telephone system, a telephone transmission channel, means to impress speech currents upon said channel for transmission thereover to a distant receiving point, a source of masking currents having a similar frequency band to that used by said speech currents, means to impress energy from said source of masking currents on said channel in such strength as to provide effective masking of said speech currents, a receiver for said signal currents at said receiving point, a hybrid balancing circuit having conjugate pairs of branches, and means to connect said channel, said source of masking currents and said receiver to different branches of said hybrid balancing circuit in such manner as to allow the speech currents to flow into said receiver while preventing said masking currents from reaching said receiver.

2. A telephone system according to claim 1, in which said source of masking currents is situated at said receiving point and means are provided for transmitting the masking currents over said channel in opposite direction to the transmission of said speech currents and in such volume as to arrive at the point of application of said speech currents to said transmission channel at a level of the order of 10 decibels higher than the level of said speech currents at the same point.

3. In a telephone system, a pair of transmission channels connected between a transmitting point and a distant receiving point, a source of speech currents and a source of noise currents at said transmitting point, said noise currents covering the frequency range of said speech currents and having sufficient volume to provide effective masking of said speech currents, means for impressing speech currents from said source on both channels in a given phase relation, means for simultaneously transmitting noise currents from said source over both of said channels in a different phase relation, whereby both speech currents and masking noise currents are simultaneously transmitted over each of said channels, a receiver at said distant receiving point, and means thereat for combining the speech currents received over both channels and applying them in additive phase to said receiver, and means for combining said noise waves received from both channels and for applying them in phase opposition to said receiver.

4. A system according to claim 3 including a delay device in the input portion of one of said channels and a duplicate delay device in the output portion of the opposite channel.

5. A system according to claim 3 including a delay device in the input portion of one of said channels and a duplicate delay device in the output portion of the opposite channel, and means for changing the amount of phase delay in both of said delay devices from time to time and to an equal extent.

6. In a secret telephone transmission system, a transmitting station and a distant receiving station, telephone transmission channel means interconnecting said stations, a source of message currents and a source of masking currents of a magnitude exceeding that of said message currents, means at said transmitting station for impressing said message currents on said channel means for transmission thereover to said distant receiving station, means to impress said masking currents from said source on said channel means for transmission between said stations, receiving means at said receiving station for said message currents, and selecting means at said receiving station for separating said message currents from said masking currents and directing said message currents to said receiving means, said selecting means consisting of a multi-winding transformer so constructed and connected to said channel means that message currents and masking currents are concurrently conducted in each of at least two windings thereof, said selecting means comprising pairs of conjugate branches including said two windings, and means for substantially balancing the impedances of said conjugate branches.

7. In a telephone system, a pair of transmission channels connected between a transmitting point and a distant receiving point, a source of speech currents and a source of noise currents at said transmitting point, said noise currents covering the frequency range of said speech currents and having sufficient volume to provide effective masking of said speech currents, means to impress speech currents from said source on both channels in the same phase relation, means to impress on both of said channels but in opposed polarities noise currents from said source simultaneously with said impressed speech currents, such that both speech currents and masking noise currents are simultaneously transmitted over each of said channels, a receiver at said distant receiving point and means thereat to combine the speech currents received over both channels and to apply them in additive phase relation to said receiver, and means to combine said noise currents received over both channels and to apply them in opposed polarities to said receiver.

8. In a telephone system, a pair of transmission channels connected between a transmitting point and a distant receiving point, a source of speech currents and a source of noise currents at said transmitting point, said noise currents covering the frequency range of said speech currents and having sufficient volume to provide effective masking of said speech currents, means to impress speech currents from said source on both channels in a given phase relation, means to continuously transmit noise currents from said source over both of said channels but in opposed polarity relation such that both speech currents and masking noise currents are simultaneously transmitted over each of said channels, a receiver at said distant receiving point and means thereat to combine the speech currents received over both channels and to apply them in additive phase relation to said receiver and to combine in opposed polarity relation the noise currents received over both channels.

9. In a secret telephone transmission system, a transmitting and a receiving station, telephone transmission channel means extending between said stations, a source of message currents and a source of masking currents of a magnitude exceeding that of said message currents, means to impress said message currents on said channel means for transmission thereover to said receiving station, receiving means at said receiving station for said message currents, and hybrid connecting-network means coupling said receiver and said source of masking currents to said channel means and in conjugate relation to each other.

10. In a secret telephone transmission system, a transmitting and a receiving station, telephone channel means extending between said stations, a source of message currents connected to said channel means, a source of masking currents, receiving means at said receiving station for the reception of said message currents, and a hybrid coupler connecting both said receiver and said source of masking currents to said channel means and in conjugate relation to each other in such manner that message currents and masking currents are simultaneously transmitted over said channel means but said conjugate relationship restricts the actuation of said receiver to said message currents only.

ARTHUR G. CHAPMAN.

REFERENCES CITED

The following references are of record in the file of this patent:

UNITED STATES PATENTS

| Number | Name | Date |
|---|---|---|
| 1,753,353 | Steinberg | Apr. 8, 1930 |
| 2,083,653 | Kasemann | June 15, 1937 |
| 2,405,599 | Mitchell | Aug. 13, 1946 |
| 2,406,841 | Levy | Sept. 3, 1946 |